(12) United States Patent
Seo et al.

(10) Patent No.: US 7,593,375 B2
(45) Date of Patent: Sep. 22, 2009

(54) MEDIUM ACCESS CONTROL APPARATUS FOR USE IN A CHANNEL OVERLAY NETWORK

(75) Inventors: Chang-Woo Seo, Suwon-si (KR); Kyung-Hun Jang, Suwon-si (KR); Jin-Youn Cho, Seoul (KR); Hyo-Sun Hwang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 317 days.

(21) Appl. No.: 11/193,874

(22) Filed: Jul. 29, 2005

(65) Prior Publication Data

US 2006/0023684 A1 Feb. 2, 2006

(30) Foreign Application Priority Data

Jul. 30, 2004 (KR) ...................... 10-2004-0060298

(51) Int. Cl.
*H04Q 7/24* (2006.01)
(52) U.S. Cl. ...................................... 370/338; 370/328
(58) Field of Classification Search ........................ None
See application file for complete search history.

(56) References Cited

U.S. PATENT DOCUMENTS

| 7,251,232 | B1* | 7/2007 | Meier .......................... 370/338 |
|---|---|---|---|
| 2002/0089959 | A1* | 7/2002 | Fischer et al. ............... 370/338 |
| 2005/0025080 | A1* | 2/2005 | Liu ............................. 370/311 |
| 2005/0068928 | A1* | 3/2005 | Smith et al. ................. 370/338 |
| 2005/0114581 | A1* | 5/2005 | Azadet et al. ............... 710/305 |
| 2007/0160081 | A1* | 7/2007 | Logvinov et al. ........... 370/469 |

* cited by examiner

*Primary Examiner*—Erika A Gary
(74) *Attorney, Agent, or Firm*—McNeely Bodendorf LLP

(57) ABSTRACT

A Medium Access Control (MAC) apparatus and method for use in a channel overlay network of a wireless access system. The wireless access system, which is based on a multi-carrier, includes a plurality of physical modules for receiving signals from a plurality of terminals, a plurality of MAC (Medium Access Control) modules for processing the signals received via the physical modules while being classified according to predetermined traffic classes, and a controller connected to the MAC modules for integratedly managing the MAC modules. The MAC apparatus includes an additional MAC module used for a control channel and a plurality of MAC modules for supporting various QoS traffic data according to individual classes, thereby improving scheduling complexity in a MAC layer.

16 Claims, 4 Drawing Sheets

MEDIUM ACCESS CONTROL APPARATUS FOR USE IN A CHANNEL OVERLAY NETWORK

PRIORITY

This application claims priority to an application entitled "MEDIUM ACCESS CONTROL APPARATUS FOR USE IN CHANNEL OVERLAY NETWORK", filed in the Korean Intellectual Property Office on Jul. 30, 2004 and assigned Serial No. 2004-60298, the contents of which are hereby incorporated by reference.

BACKGROUND OF THE INVENTION

1. Field of the Invention

The present invention relates generally to a WLAN (Wireless Local Area Network) system, and more particularly to a MAC (Medium Access Control) control apparatus for use in a WLAN system.

2. Description of the Related Art

Recently, the IEEE 802.11a/g standard has been established as the latest WLAN technology standard, such that high-speed wireless equipment capable of supporting a transfer rate of 54 Mbps have recently been introduced to the market. With the increasing demands of users, networking technologies of household appliances included in a home network have also been proposed as a major issue of the WLAN technologies. Many developers have conducted extensive research into the WLAN technologies in order to increase wireless speed and data throughput, and currently attempt to raise a wireless link speed to 200 Mbps using a MIMO (Multiple Input Multiple Output) technology of the IEEE 802.11 TGn standardization group.

The MAC (Medium Access Control) layer applies a resource request scheme to a random access scheme in order to increase efficiency of radio resources, thereby raising the MAC throughput to 80%.

However, there are some problems in applying such WLAN technologies to a home network even though the wireless link speed and the MAC throughput are increased. More specifically, some problems occur in interconnecting household appliances over a wireless network due to characteristics of a variety of household appliances (e.g., digital TVs, Internet phones (i.e., VoIP (Voice over Internet Protocol) phones), game machines, audio systems, etc.) capable of providing a variety of data services, resulting in QoS (Quality of Service) support complexity, QoS setup difficulty, communication frequency band limitation, etc.

Summarizing individual data characteristics of the above-described household appliances, digital TV uses an MPEG2 data stream having a variable bit rate of 20 Mbps, and has a high variation in data rate. A VoIP phone data has a time period below 1 Mbps, and requires real-time transmission sensitive to transfer delay and jitters. Additionally, data for use in a game machine has a random period below 1 Mbps, has very weak resistance to transfer delay, and requires real-time transmission. Data for use in the audio system has a time period of about 1 Mbps, has very weak resistance to jitters, and requires a constant speed. Further, computer data is configured in the form of a large capacity file or Internet data, and is not greatly affected by transfer delay, but it has a high variation in data rate.

Generally, data characteristics for household appliances are classified into traffic data having a short delay time, random traffic data having a short delay time, and other traffic data not greatly affected by a long delay time, while simultaneously having a high variation in data rate.

The IEEE 802.11 standard established as a WLAN standard is based on a DCF transmission scheme using a CSMA/CA (Carrier Sense Multiple Access/Collision Avoidance). However, the DCF (Distributed Coordination Function) transmission scheme does not support any kind of priorities in accessing a wireless medium, such that it is difficult to guarantee a QoS. Although the DCF transmission scheme can use a PCF (Point Coordination Function) transmission scheme defined as an optional item, the PCF transmission scheme based on the DCF transmission scheme cannot separately define traffic type information, and cannot estimate a transfer time, such that it is not widely implemented up to the present time.

The EDCF (Enhanced DCF) proposed by the IEEE 802.11e standard can define eight traffic/priority types, and the high priority traffic data has an AIFS (Arbitration Inter Frame Space) of a shorter time. Additionally, an HCF (Hybrid Coordination Function) scheme has been proposed to extend the polling mechanism of PCF such that a hybrid controller polls the stations during a contention-free period and grants a specific start time and a maximum transmit duration. However, the HCF scheme must control traffic data requiring various QoSs using only one MAC entity, such that it unavoidably increases MAC complexity and has difficulty in supporting a high QoS requirement requested by the household appliances.

SUMMARY OF THE INVENTION

Therefore, the present invention has been designed in view of the above and other problems, and it is an object of the present invention to provide a MAC apparatus for processing various services requiring a variety of QoSs in a MAC layer while being classified according to traffic type information, such that it can reduce data processing complexity in the MAC layer.

It is another object of the present invention to provide a MAC apparatus that enables a plurality of MAC modules, which classify various services requiring a variety of QoSs according to traffic type information and process traffic data for every type information, to process traffic data of individual type information, such that it reduces scheduling complexity and performs fair scheduling.

In accordance with one aspect of the present invention, the above and other objects can be accomplished by a media access control apparatus of a wireless access system. The media access control apparatus for a wireless access system includes a plurality of physical modules which transmit and receive data to and from a plurality of terminals, a plurality of MAC modules connected to the respective physical modules, the MAC modules processing data having different traffic characteristics, respectively, and a controller connected to the MAC modules for integrally controlling the MAC modules.

In accordance with another aspect of the present invention, a media access control method for a wireless access system having an AP (Access Point) for providing a plurality of terminals with network access services. The method includes the steps of scanning a basic channel to receive a beacon signal, selecting an Access Point (AP) based on the beacon signal, requesting a MAC (Medium Access Control) service to the selected AP, selecting a channel according to a response signal to the MAC service request, and transmitting data to the AP over the selected channel.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Figure 1:
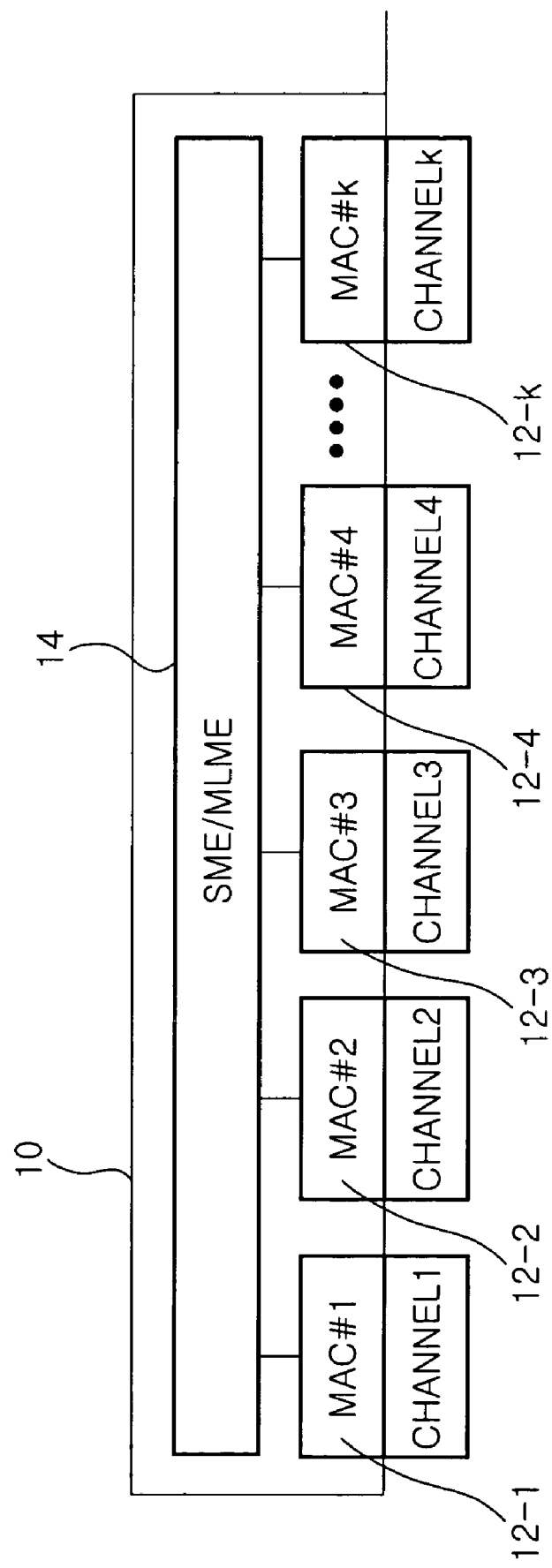
FIG. 1 is a block diagram illustrating a MAC apparatus in accordance with a preferred embodiment of the present invention.

Preferred embodiments of the present invention will be described in detail herein below with reference to the annexed drawings. In the drawings, the same or similar elements are denoted by the same reference numerals even though they are depicted in different drawings. Further, in the following description, a detailed description of known functions and configurations incorporated herein will be omitted when it may obscure the subject matter of the present invention.

The present invention is directed to a MAC access control procedure and a MAC access association procedure for processing QoS traffic data required for a variety of household appliances when a WLAN is applied to a home network. More specifically, the present invention classifies traffic data requiring a variety of QoSs such as phones, video sets, game machines, etc., into a plurality of classes. The traffic classes can be, for example, a periodic and delay sensitive traffic class, an irregular-and delay sensitive traffic class, and an irregular and delay insensitive class. The periodic-and delay sensitive traffic class periodically occurs according to a requested QoS, and is sensitive to delay. The irregular and delay sensitive traffic class occurs irregularly, and is sensitive to delay. The irregular and delay insensitive class occurs irregularly, and is not sensitive to delay.

FIG. 1 is a block diagram illustrating a MAC apparatus in accordance with a preferred embodiment of the present invention. Referring to FIG. 1, the MAC device 10 includes a controller 14, which includes a plurality of MAC modules 12-1 to 12-k for processing QoS traffic data corresponding to the aforementioned classes, a MAC Layer Management Entity (MLME) for controlling the MAC modules 12-1 to 12-k, and a Station Management Entity (SME) for controlling overall functions of an Access Point (AP). The MAC modules are connected to individual physical layer devices, and separately process radio frames received via the physical layer devices.

The MAC device 10 acts as an AP for supporting additional MAC protocols to multiple MAC areas according to service characteristics. The controller 14 acts as a single SME/MLME for integratedly controlling the MAC modules.

Individual MAC modules are operated by different MAC protocols and are assigned different MAC channels. For example, the first MAC module 12-1 assigned an audio channel is operated by an MP(Multi-Poll)-DCF protocol, the second MAC module 12-2 is operated by an HCF or EDCF protocol suitable for a video channel, the third MAC module 12-3 is in charge of a game channel, and the fourth module 12-4 in charge of a control channel is operated by a DCF protocol.

In accordance with a preferred embodiment of the present invention, an MP-DCF protocol, a DCF protocol, an EDCF protocol, and an HCF protocol are used as the MAC protocol, but it should be noted that the present invention is not limited to the aforementioned protocols. If other MAC protocols are developed at a later time, they can also be applied to the present invention if needed. The number of MAC modules can be increased or reduced according to communication environments.

Figure 2:
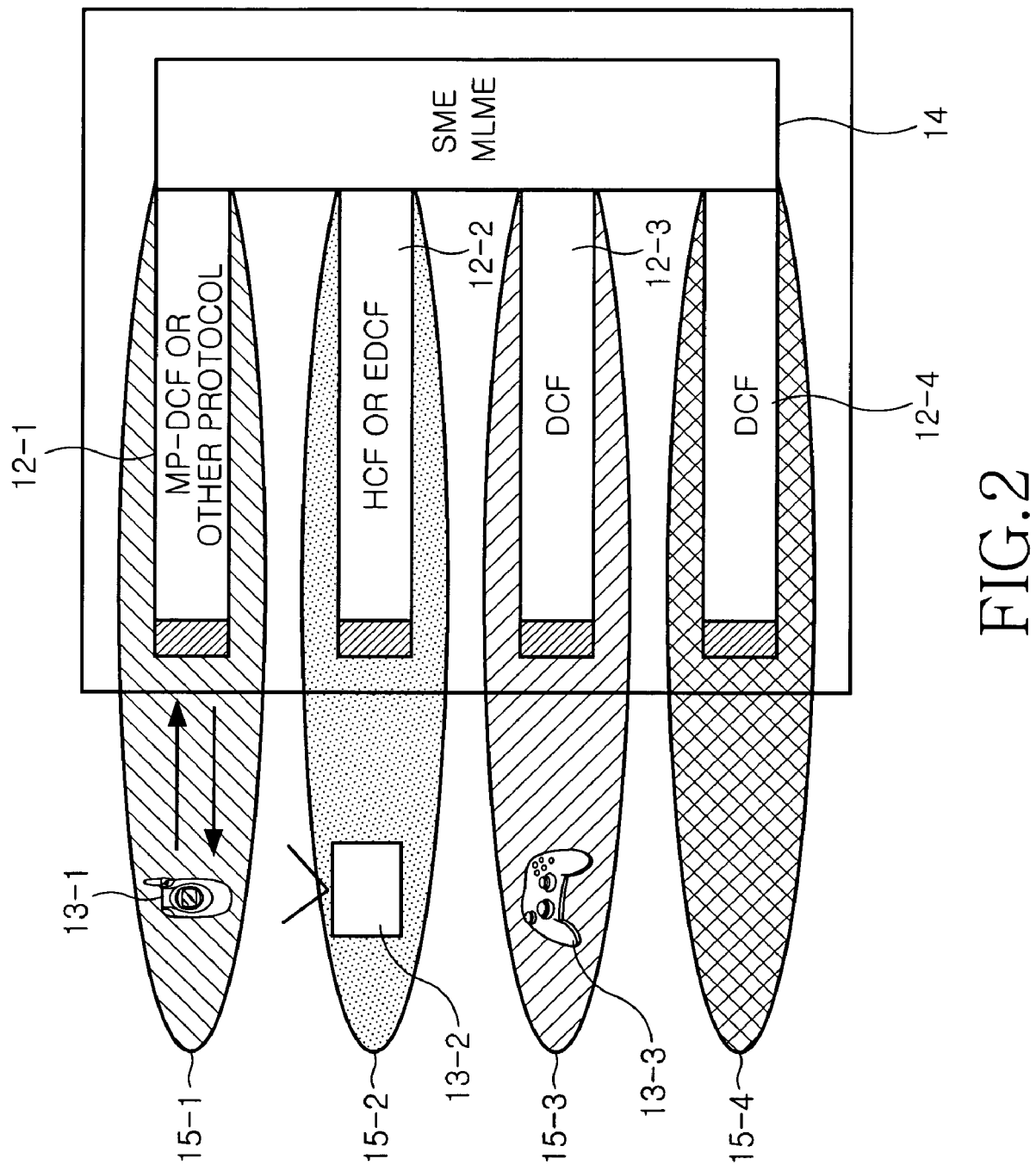
FIG. 2 is a conceptual diagram illustrating a MAC method in accordance with a preferred embodiment of the present invention.
Figure 3:
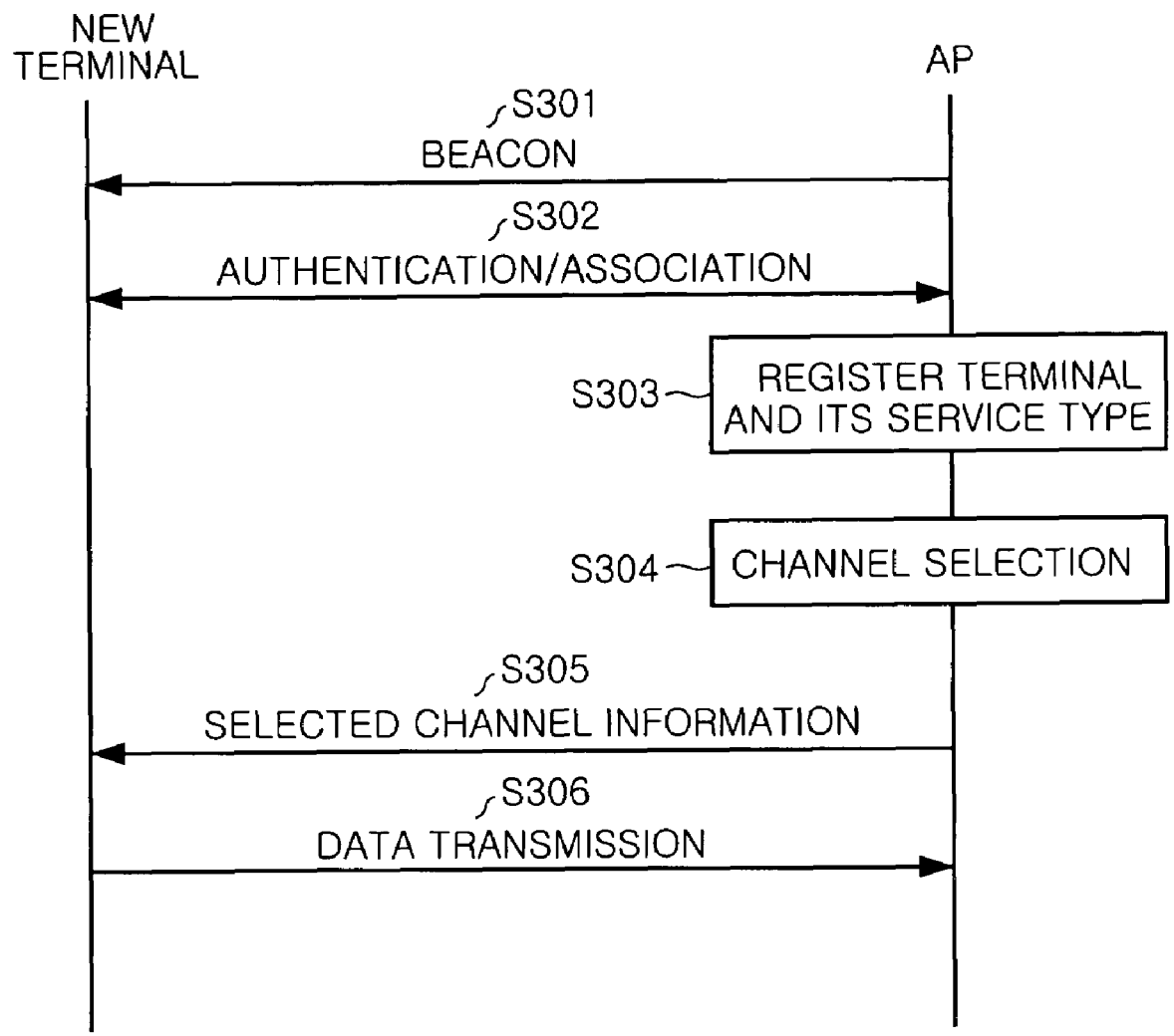
FIG. 3 is a flow chart illustrating a MAC method in accordance with a preferred embodiment of the present invention.

FIG. 2 is a conceptual diagram illustrating a MAC method in accordance with a preferred embodiment of the present invention. FIG. 3 is a flow chart illustrating a MAC method in accordance with a preferred embodiment of the present invention.

For the convenience of description and better understanding of the present invention, it is assumed that the controller 14 includes four MAC modules 12-1 to 12-4 operated by different MAC protocols (i.e., MP-DCF, HCF, and DCF protocols).

Referring to FIG. 2, the first MAC module 12-1 provides a communication service associated with a VoIP phone 13-1 using the MP-DCF protocol over a predetermined channel 15-1 used for an audio service. The second MAC module 12-2 communicates with a digital TV 13-2 using an HCF protocol over a predetermined channel 15-2 used for a video service. The third MAC module 12-3 communicates with the game machine 13-3 using the DCF protocol over a predetermined channel 15-3 used for an entertainment service. The fourth MAC module 12-4 provides a control channel using the DCF protocol.

If a new terminal appears under the above condition, the new terminal receives a beacon message from the MAC device over a basic control channel, and determines the presence of the neighboring MAC device at step S301. The basic channel is an initial default channel for searching for the beacon message when different types of terminals enter a network.

After receiving the beacon message, the terminal performs general authentication and association procedures with the MAC device at step S302. More specifically, the terminal provides service type information required for the MAC device at the authentication and association procedures at step S302, and the MAC device registers service type information of a corresponding terminal at step S303.

The MAC device selects a MAC module suitable for a corresponding service according to the terminal information and the service type information at step 304, and transmits channel information assigned to the selected MAC module to the terminal at step S305. Upon receiving the channel information, the terminal transmits data to the MAC device over a corresponding channel at step S306. For example, if the terminal is a video device, the MAC device provides the terminal with information for a video channel assigned to the second MAC module 12-2, which is operated by HCF or EDCF protocol.

Figure 4:
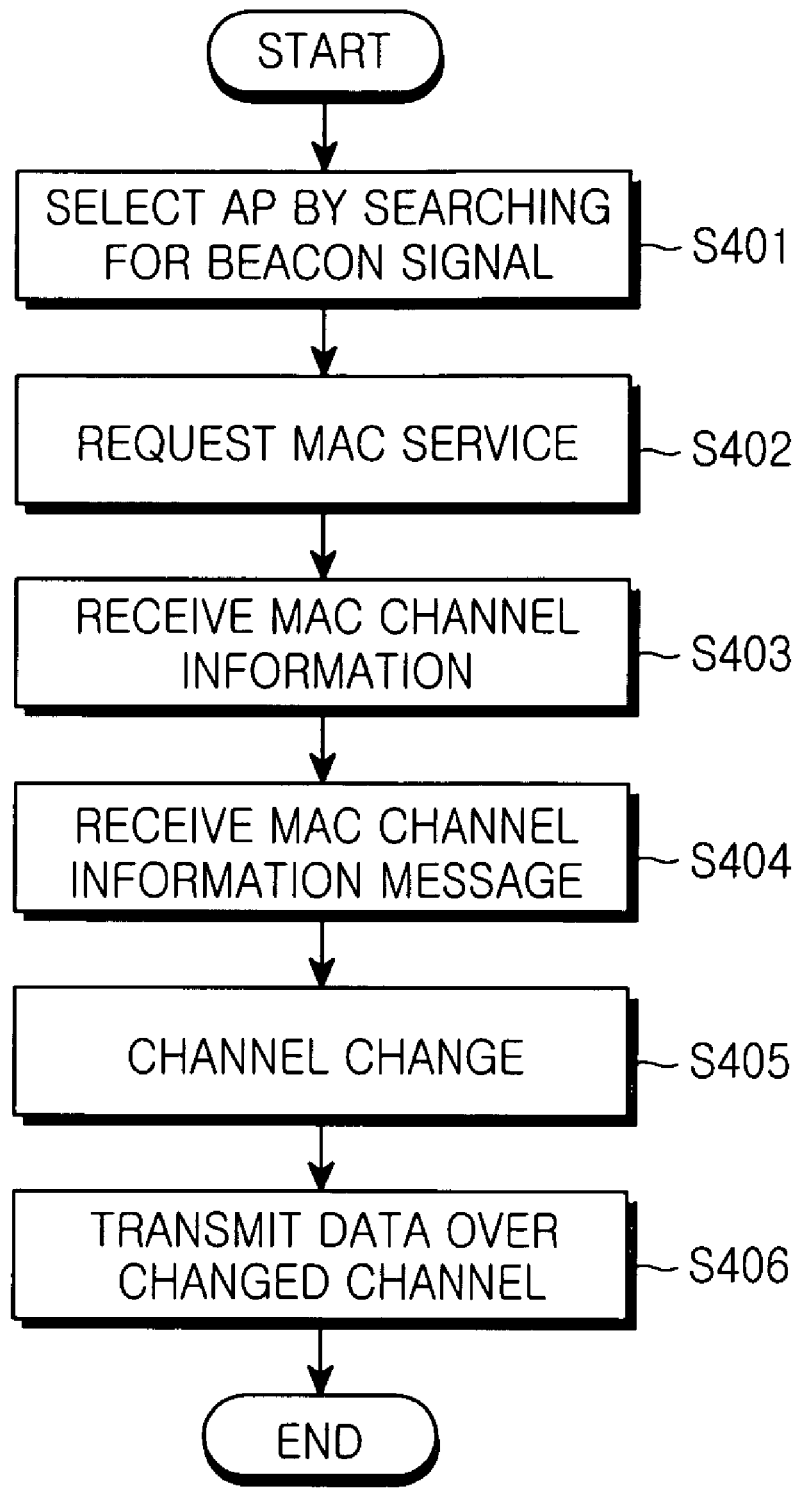
FIG. 4 is a flow chart illustrating a network access process between terminals in a system in accordance with a preferred embodiment of the present invention.

FIG. 4 is a flow chart illustrating a network access process between terminals in a system in accordance with a preferred embodiment of the present invention. Referring to FIG. 4, the terminal enters a network, and selects an access point (AP) by searching for a beacon signal over the basic channel at step S401. If the AP is selected, the terminal transmits a MAC service request message including its service type information to a corresponding AP at step 402.

Upon receiving the MAC service request message, the AP provides corresponding terminal information to a MAC module for managing a MAC channel pre-assigned for a corresponding service according to the service type information included in the MAC service request message and transmits corresponding MAC channel information. The terminal receives the MAC channel information transmitted from the AP at step S403. The terminal changes its communication channel from an initial basic channel to a newly assigned MAC channel according to the MAC channel information at step S404, and transmits data over the changed channel at step S405.

As is apparent from the description above, the MAC device according to the present invention includes an additional MAC module for a control channel and a plurality of MAC modules supporting QoS traffic data of various classes according to individual classes, thereby improving scheduling complexity in a MAC layer.

Additionally, the MAC method according to the present invention classifies services according to traffic characteristics, such that it can easily schedule service and enhances QoS reliability.

Further, the MAC method according to the present invention advantageously overcomes a band limitation problem while using a conventional physical layer.

The MAC method accordance to the present invention can increase or reduce the number of MAC modules according to a network environment. Although a heterogeneous MAC protocol may be developed at a later time, the MAC method installs a corresponding protocol in the form of a MAC module, such that it can easily accommodate the heterogeneous MAC protocol.

Although preferred embodiments of the present invention have been disclosed for illustrative purposes, those skilled in the art will appreciate that various modifications, additions, and substitutions are possible, without departing from the scope and spirit of the present invention as disclosed in the accompanying claims.

What is claimed is:

1. A media access control apparatus for a wireless access system comprising:
   a plurality of physical modules for transmitting and receiving data to and from a plurality of terminals;
   a plurality of Medium Access Control (MAC) modules connected to the plurality of physical modules, wherein at least two of the plurality of MAC modules processing data having different traffic characteristics; and
   a controller connected to the plurality of MAC modules for integrally controlling the plurality of MAC modules,
   wherein the at least two of the plurality of MAC modules operate in different MAC protocols.

2. The apparatus of claim 1, wherein each of the plurality of physical modules receives the data on a corresponding one of predetermined channels.

3. The apparatus of claim 1, wherein the data is classified into a periodic and delay sensitive traffic class that periodically occurs according to a requested Quality of Service (QoS) and is sensitive to delay, an irregular and delay sensitive traffic class that occurs irregularly and is sensitive to delay, and an irregular and delay insensitive class that occurs irregularly and is not sensitive to delay.

4. The apparatus of claim 1, wherein each of the plurality of MAC modules process only the data of the traffic class designated by a corresponding MAC protocol.

5. The apparatus of claim 4, wherein the controller assigns a MAC channel to each of the plurality of MAC modules according to a variation in a channel environment.

6. The apparatus of claim 5, wherein the MAC channel is multiplexed according to a number of terminals communicating with a corresponding channel.

7. The apparatus of claim 1, wherein the MAC protocols include a Distributed Coordination Function (DCF), a Hybrid Coordination Function(HCF), an Enhanced DCF (EDCF), and an Multi-Poll (MP)-DCF.

8. The apparatus of claim 1, further comprising an additional MAC module for providing a control channel.

9. The apparatus of claim 1, wherein each of the plurality of MAC modules operates in a unique MAC protocol.

10. A media access control method for a wireless access system having an Access Point (AP) for providing a plurality of terminals with network access services, the method comprising:
    transmitting a Medium Access Control (MAC) service request to the AP;
    receiving a response to the MAC service request from the AP; and
    transmitting data to the AP over a channel according to information on the channel for providing a MAC service,
    wherein the information is included in the response, the MAC service is one of a plurality of MAC services, the plurality of MAC services are provided over MAC channels, and at least two of the MAC services operate under different MAC protocols.

11. The method of claim 10, wherein the plurality of MAC services include a periodic and delay sensitive service that periodically occurs according to traffic characteristics of the terminals and is sensitive to delay, an irregular and delay sensitive service that occurs irregularly and is sensitive to delay, and an irregular and delay insensitive service that occurs irregularly and is not sensitive to delay.

12. The method of claim 11, wherein:
    the transmitting of the MAC service request to the AP comprises transmitting service type information to the AP, and
    receiving of the response comprises receiving the response having information of a MAC channel pre-assigned for the MAC service according to the service type information.

13. The method of claim 12, wherein the information on the channel is the information of the MAC channel pre-assigned for the MAC service.

14. The method of claim 10, wherein the MAC service is multiplexed according to a number of terminals requesting an identical MAC service.

15. A media access control method for a wireless access system having an Access Point (AP) for providing a plurality of terminals with network access services, the AP having a plurality of physical modules for transmitting and receiving data to and from the plurality of terminals, a plurality of Medium Access Control (MAC) modules connected to the plurality of physical modules, and a controller connected to the plurality of MAC modules for integrally controlling the plurality of MAC modules, wherein at least two of the plurality of MAC modules process data having different traffic characteristics and operate in different MAC protocols, the method comprising:
    transmitting a MAC service request to the AP;
    receiving a response to the MAC service request from the AP; and
    transmitting data to the AP over a channel according to information on the channel for providing a MAC service, wherein the information is included in the response, the MAC service is one of a plurality of MAC services, and the plurality of MAC services are provided over MAC channels assigned to individual services.

16. The method of claim 15, wherein the plurality of MAC services include a periodic and delay sensitive service that periodically occurs according to traffic characteristics of the terminals and is sensitive to delay, an irregular and delay sensitive service that occurs irregularly and is sensitive to delay, and an irregular and delay insensitive service that occurs irregularly and is not sensitive to delay.

* * * * *